(12) United States Patent
Zwak et al.

(10) Patent No.: US 8,434,892 B2
(45) Date of Patent: May 7, 2013

(54) COLLIMATOR ASSEMBLY

(75) Inventors: Zdislav Zwak, Havirov (CZ); Miroslav Kropac, Ostrava (CZ); Milan Cejnek, Novy Jicin (CZ)

(73) Assignees: Varroccorp Holding BV (NL); Varroc Engineering Private Limited (IN); Varroc Lighting Systems S.R.O. (CZ)

( * ) Notice: Subject to any disclaimer, the term of this patent is extended or adjusted under 35 U.S.C. 154(b) by 22 days.

(21) Appl. No.: 13/075,273

(22) Filed: Mar. 30, 2011

(65) Prior Publication Data

US 2012/0250308 A1 Oct. 4, 2012

(51) Int. Cl.
*F21V 7/06* (2006.01)

(52) U.S. Cl.
USPC ............... 362/235; 362/249.02; 362/296.1; 362/800

(58) Field of Classification Search .......... 362/612, 362/613, 616, 509, 511, 545, 800
See application file for complete search history.

(56) References Cited

U.S. PATENT DOCUMENTS

| | | | |
|---|---|---|---|
| 4,767,172 A | 8/1988 | Nichols et al. | |
| 4,978,952 A | 12/1990 | Irwin | |
| 5,841,596 A | 11/1998 | Perlo et al. | |
| 6,097,549 A | 8/2000 | Jenkins et al. | |
| 6,416,237 B2 | 7/2002 | Lissotschenko et al. | |
| 6,536,923 B1 | 3/2003 | Merz | |
| 6,621,631 B2 | 9/2003 | Lissotshenko et al. | |
| 6,871,988 B2 | 3/2005 | Gebauer et al. | |
| 6,940,660 B2 | 9/2005 | Blumel | |
| 7,275,849 B2 * | 10/2007 | Chinniah et al. | 362/555 |
| 7,290,906 B2 | 11/2007 | Suzuki et al. | |
| 7,347,603 B2 | 3/2008 | Ikeda et al. | |
| 7,401,948 B2 | 7/2008 | Chinniah et al. | |
| 7,401,963 B2 | 7/2008 | Stefanov et al. | |
| 7,448,783 B2 | 11/2008 | Ohkawa | |
| 7,483,220 B2 * | 1/2009 | Kittelmann et al. | 359/742 |
| 7,648,256 B2 | 1/2010 | Shiratsuchi et al. | |
| 7,651,246 B2 | 1/2010 | Bollea et al. | |
| 7,697,219 B2 | 4/2010 | DiDomenico | |
| 8,029,157 B2 * | 10/2011 | Li et al. | 362/249.02 |
| 2010/0079872 A1 | 4/2010 | Destain | |

FOREIGN PATENT DOCUMENTS

| | | |
|---|---|---|
| DE | 102010018119 A1 | 10/2001 |
| WO | 0169300 A2 | 9/2001 |
| WO | 2004034100 A2 | 4/2004 |
| WO | 2007016363 A2 | 2/2007 |
| WO | 2007069123 A2 | 6/2007 |

* cited by examiner

*Primary Examiner* — Anabel Ton
(74) *Attorney, Agent, or Firm* — Cantor Colburn LLP

(57) ABSTRACT

A flat refractive collimator assembly including a light guide and a light source, for example, an LED. The sides of the light guide defines a collimating reflective surface having a paraboloidal shape with a collimating focal point placed on the axis of the light guide. The central portion of the light guide defines a main reflective surface having a virtual focal point, which is substantially similar to the collimating focal point. The collimating reflective surface is a paraboloidal surface or is formed as a plurality of paraboloidal segments having various focal lengths and having a common collimating focal point. The collimating reflective surface can also include spread optics.

17 Claims, 4 Drawing Sheets

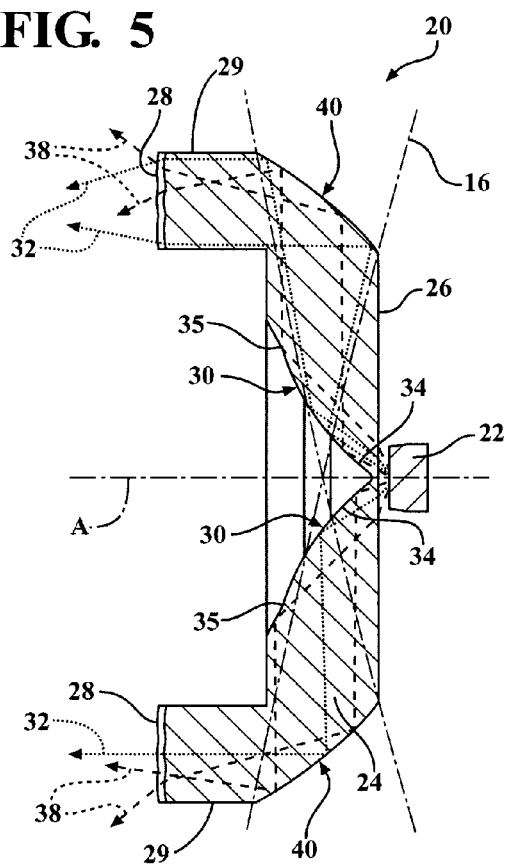
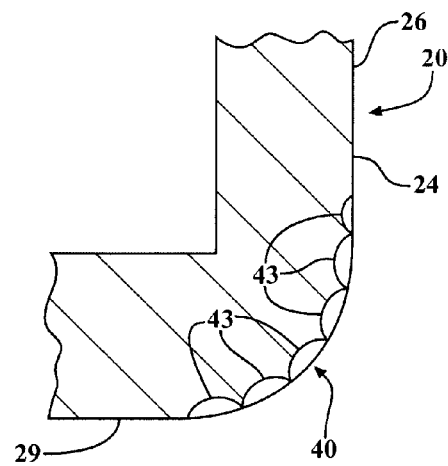
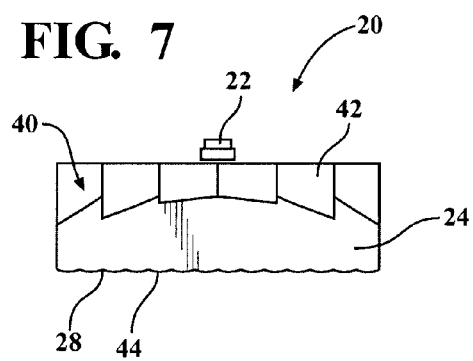
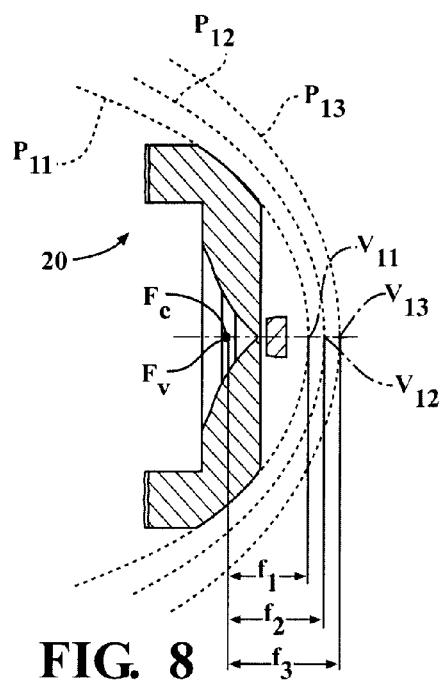

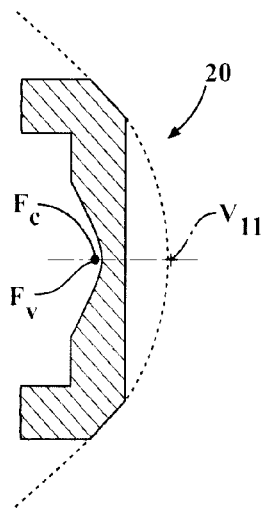 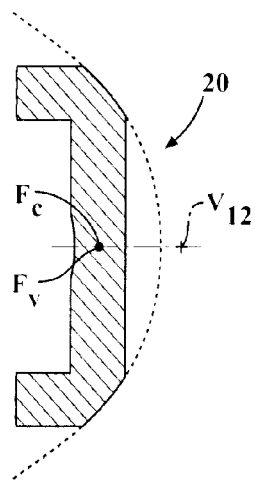 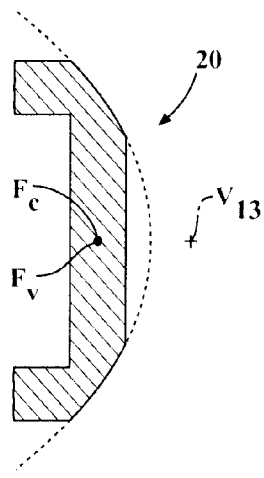
FIG. 9A  FIG. 9B  FIG. 9C
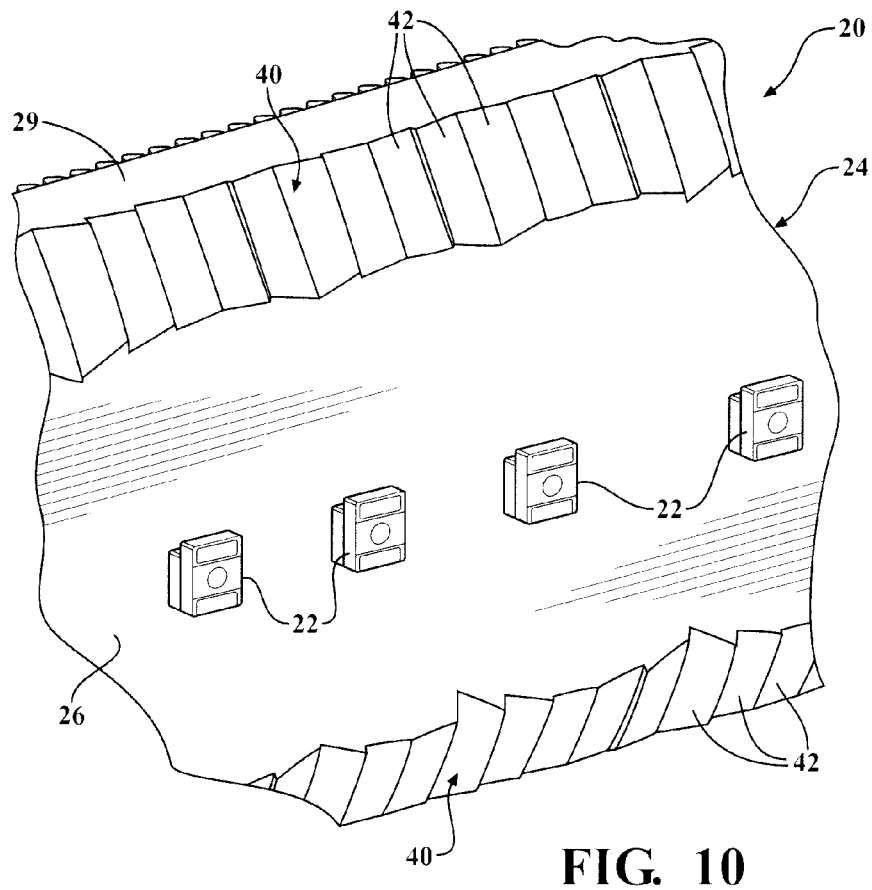
FIG. 10

COLLIMATOR ASSEMBLY

BACKGROUND OF THE INVENTION

1. Field of the Invention

The subject invention is related to a reflective collimator assembly for guiding light from a light source. More specifically, the subject invention is related to a reflective collimator assembly for guiding light from lamps on automobiles.

2. Description of the Prior Art

Typically, incandescent or halogen bulbs are used for vehicle lamps, e.g. turn signal lamps, brake lamps, low beam headlight lamps, high beam headlight lamps, etc. More recently, automobile makers have begun using light emitting diodes (LEDs) in automobile lamps for increased efficiency and reliability purposes. However, typically a collimator is required to guide the light emitted by the LEDs.

One type of collimator is a non-focal optics based collimator. The disadvantage of this solution is increased collimator depth, which leads to increased material consumption, increased material costs and increased mass on the vehicle. Moreover, such a collimator requires a large amount of manufacturing time and effort for press-cooling to prevent unequal material shrinkage. Even further, such collimators only guide the light in one direction and do not allow the light to spread over wide angles. Therefore, the light source is not visible over a wide range of viewing angles. This is particularly disadvantageous when used in a signal lamp of a vehicle.

There remains a significant and continuing need for improved collimators for guiding light.

SUMMARY OF THE INVENTION

The subject invention is related to a reflective collimator assembly for guiding light from a light source. More specifically, the subject invention is related to a reflective collimator assembly for guiding light from front and rear signal lamps on automobiles.

The collimator assembly generally includes a light source for emitting light and a light guide for collimating the light. The light guide is disposed about an axis and has a main reflective surface and a collimating reflective surface. The collimating reflective surface has a collimating focal point disposed substantially on the axis of the light guide, and the main reflective surface has a virtual focal point substantially similar to the collimating focal point, or within a set range depending on the structure of the overall lamp assembly.

The majority of the light emitted by the light source is aimed into a direction approximately parallel with the axis. The remainder of the light emitted by the light source is directed at wide angles, which improves the visibility of the associated light source from a wide range of viewing angles. When the subject invention is used in a lamp on an automobile, the associated lamp is more visible in a wide range of viewing angles. The lamp could be, for example, a brake lamp, a turn signal lamp, a low beam headlight lamp or a high beam headlight lamp.

The subject invention is also advantageous because it is capable of a reduced package size, specifically because it is capable of being flatter than the prior art collimator assemblies, yet achieves the requisite luminous intensity needed for automobile lamps. Further, the housing containing the collimator assembly can be smaller than the housings containing the prior art collimator assemblies. This results in material savings, weight savings and other cost savings. Reduced package size allows increased options for placement of a lamp assembly. The subject invention can be used with either a single light source, e.g. an LED, or with a plurality of light sources, e.g. a plurality of LEDs printed on a printed circuit board.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 5 is a cross-sectional view of the collimator assembly taken along line 4-4 of FIG. 3 and showing the direction of travel for a plurality of light beams emitted by the light source;

FIG. 6 is an enhanced view of the collimating reflective surface;

FIG. 7 is a top view of the collimator assembly of FIG. 1;

FIG. 8 is a cross-sectional view of the collimator assembly taken along line 4-4 of FIG. 3 and showing the peaks and the building curves of the paraboloidal surfaces;

FIG. 9A is a cross-sectional view of the flat refractive collimator taken along line A-A of FIG. 3 and showing the peak and the building curve of the paraboloidal surface;

FIG. 9B is a cross-sectional view of the flat refractive collimator taken along line B-B of FIG. 3 and showing the peak and the building curve of the paraboloidal surface;

FIG. 9C is a another cross-sectional view of the flat refractive collimator taken along line C-C of FIG. 3 and showing the peak and the building curve of the paraboloidal surface;

FIG. 10 is a rear perspective view of the collimator assembly including a plurality of LEDs and a plurality of light guides;

DETAILED DESCRIPTION OF THE ENABLING EMBODIMENTS

Referring to the Figures, wherein like numerals indicate corresponding parts throughout the several views, a collimator assembly 20 is generally shown in FIGS. 1-12. The collimator assembly 20 includes a light source 22 for emitting light and a light guide 24 for collimating the light. The light source 22 of the exemplary embodiment is a light emitting diode (LED) 22, though it should be appreciated that the light source 22 could be an incandescent bulb, a halogen bulb, a laser or any other light emitting device.

Figure 1:
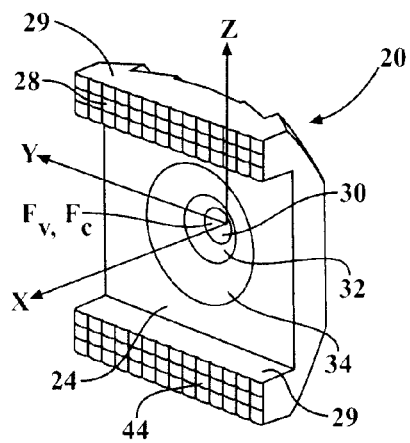
FIG. 1 is a perspective view of the front of an exemplary collimator assembly.
Figure 2:
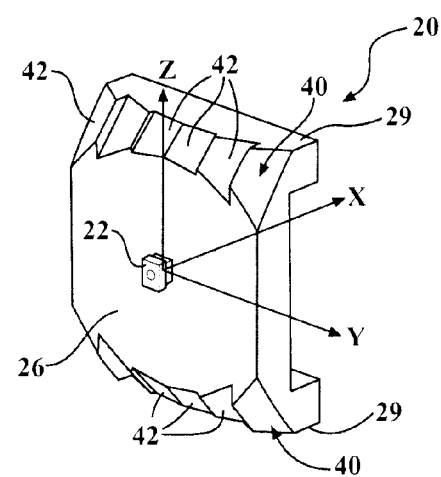
FIG. 2 is a perspective view of the back of the collimator assembly.
Figure 3:
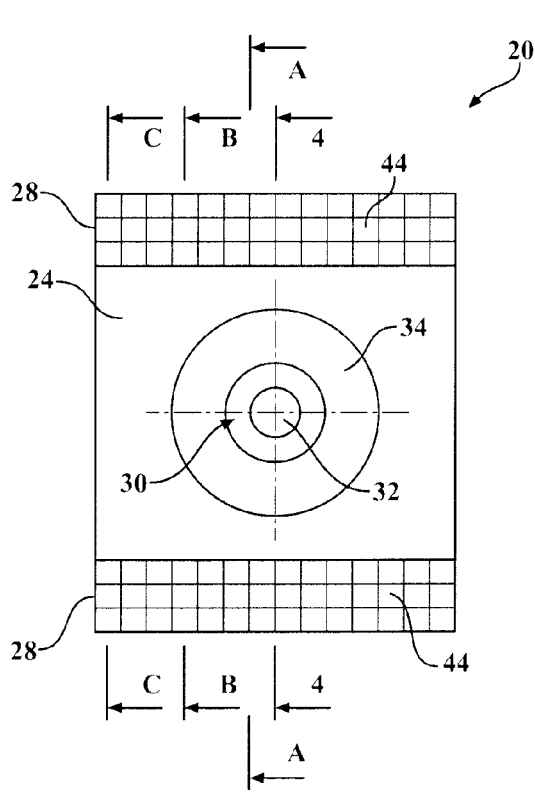
FIG. 3 is a front view of the collimator assembly.
Figure 4:
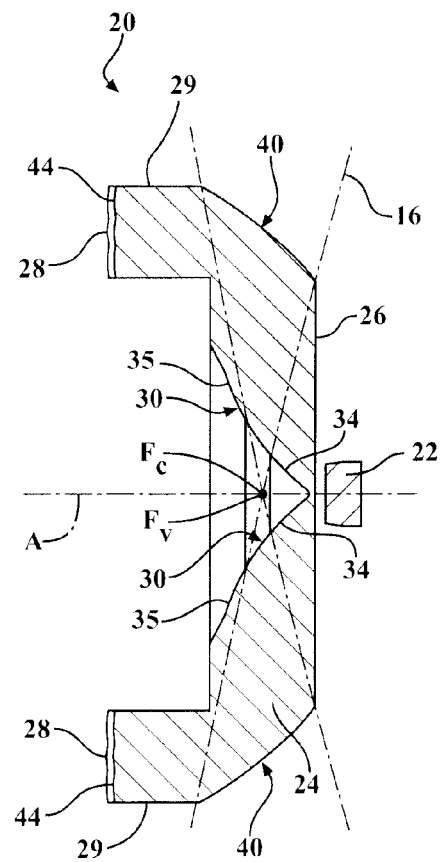
FIG. 4 is a cross-sectional view of the collimator assembly taken along line 4-4 of FIG. 3.

The light guide 24 defines an input surface 26 for receiving the light from the LED 22 and a pair of output surfaces 28, each disposed on a light pipe 29, for discharging the light. As best shown in FIG. 4, the light guide 24 is aligned along an axis A with the LED 22, and the input surface 26 faces the LED 22. The LED 22 is disposed between the light pipes 29. The light guide 24 includes a main reflective surface 30 (generally indicated) having a generally conical shape. As shown with dotted lines 32 in FIG. 5, much of the light emitted by the LED 22 is reflected by the main reflective surface 30 into a substantially radial direction.

As best shown in FIG. 5, the main reflective surface 30 could be angled to include a first reflecting surface portion 34 and a second reflecting surface portion 35. In the exemplary embodiment, the first and second reflecting surface portions 34, 35 are angled relative to one another. FIG. 5 also shows another pair of dashed lines 38 indicating the direction of travel for a pair of light beams that are reflected by the first and second reflecting surface portions 34, 35. Each of the first and second reflecting surface portions 34, 35 has a virtual focal point $F_v$ disposed substantially along the axis A, as best shown in FIG. 4. As viewed in cross-section, the first and second reflecting surface portions 34, 35 also could have a line, a parabolic or a circular shape.

The light guide 24 further defines a collimating reflective surface 40 (generally indicated) spaced radially from the main reflective surface 30. In the exemplary embodiment, and best shown in FIG. 2, the collimating reflective surface 40 includes a plurality of paraboloidal segments 42 having various focal lengths. In other words, as shown in Figures 9A-C, each of the paraboloidal segments 42 has the profile of a parabola. Each of the paraboloidal segments 42 also has a collimating focal point (best shown in FIG. 4) $F_c$ that is disposed substantially along the axis A and is substantially similar to the virtual focal point $F_v$, of the main reflective surface 30. Specifically, as shown in FIG. 4, both the collimating focal point $F_c$ of the paraboloidal segments 42 and the virtual focal point $F_v$, of the main reflective surface are spaced a distance from the input surface 26 substantially equal to or less than the thickness of the light guide 24. In one example, the light guide is 5 mm thick, and therefore, the virtual focal point $F_v$, and the collimating focal point $F_c$ are spaced along the axis A less than 5 mm or less from the input surface 26.

As shown in FIG. 6, the collimating reflective surface 40 could additionally include a plurality of spread elements 43, or irregularities for dispersing the light being reflected. This makes the collimating surface 40 more resistant to any misalignment between the LED 22 and the light guide 24. Moreover, the dispersing of the light being reflected by the collimating reflecting surface 40 also improves the visibility of the light over a wide range of viewing angles.

As shown in FIG. 4, the output surface 28 of the light guide 24 is aligned axially with the collimating reflective surface 40. In the exemplary embodiment, the output surface 28, like the collimating reflecting surface 40, defines a plurality of spread elements 44. In the exemplary embodiment, each of the spread elements 44 on the output surface 28 have a curved surface for dispersing light into various directions. When the collimator assembly 20 is installed in a lamp of an automobile, the spread elements 44 improve the visibility of the lamp over a wide range of viewing angles.

FIG. 8 is a cross-sectional view of the exemplary light guide 24. Points $V_{f1}$, $V_{f2}$ and $V_{f3}$ represent the peaks of the paraboloids and curves $P_{f1}$, $P_{f2}$ and $P_{f3}$ represent the building curves forming the paraboloidal segments 42 of the collimating reflective surface 40. The distances $f_1$, $f_2$ and $f_3$ are the focal lengths of the paraboloids based on building curves $P_{f1}$, $P_{f2}$ and $P_{f3}$ with substantially similar focal points $F_c$. FIGS. 9A-C are cross-sectional views of the exemplary light guide 24 taken at different distances from the center of the light guide 24.

Figure 11:
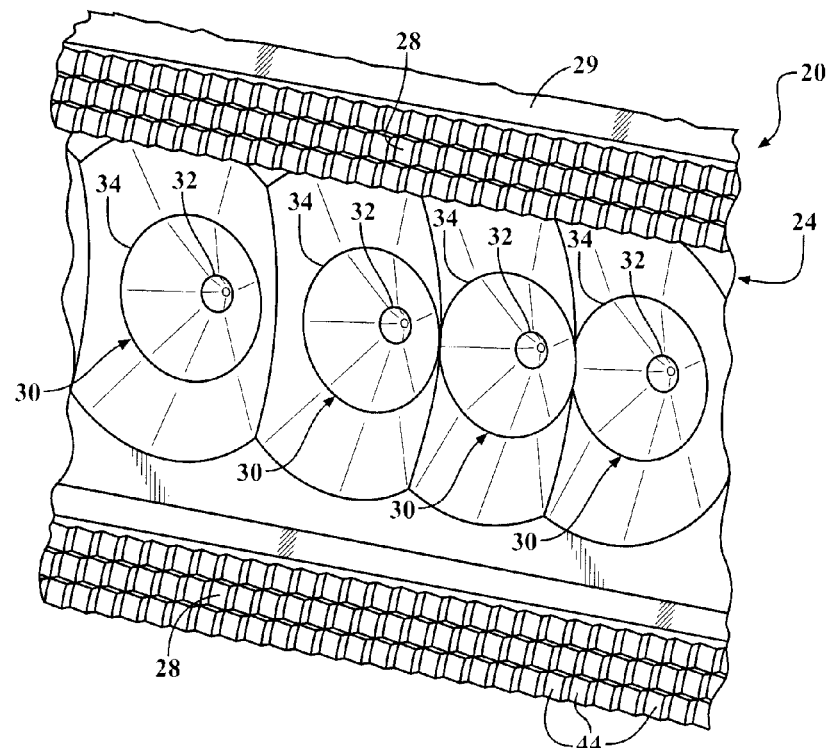
FIG. 11 is a front perspective view of the collimator assembly including a plurality of light guides.
Figure 12:
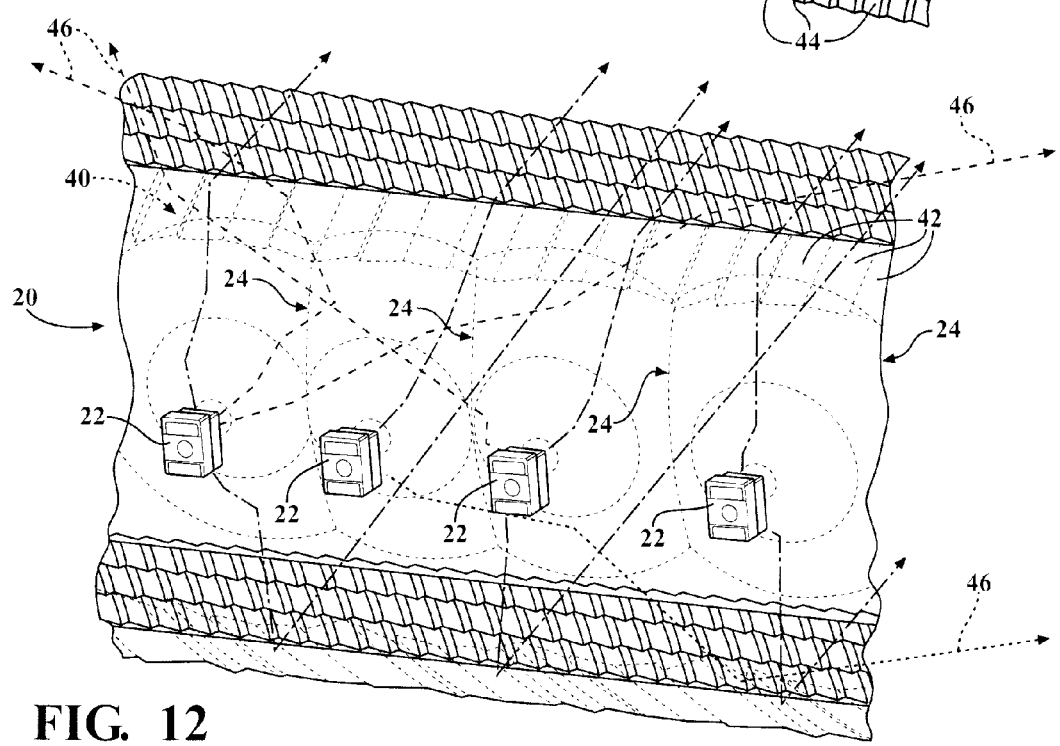
FIG. 12 is a perspective view of the collimator assembly including a plurality of LEDs and a plurality of light guides and showing the direction of travel for a plurality of light beams emitted by the LEDs.

As shown in FIGS. 10-12, the collimator assembly 20 may include a plurality of LEDs 22 and a plurality of light guides 24 arranged in a side-by-side configuration. The LEDs 22 could be arranged on a printed circuit board (not shown) or could be mounted on any other medium. In the exemplary embodiment, the light guides 24 are connected to one another. As shown with dashed arrows 46 in FIG. 12, some of the light emitted from the LEDs 22 which does not enter the input surface 26 of the associated light guide 24 will be reflected by the light guide 24 of an adjacent LED 22. This light will often take an alternate path through the light guide 24 and exit at a wide angle. When the collimator assembly 20 is installed on a lamp of an automobile, this will further improve the visibility of the lamp over a wide range of viewing angles.

The foregoing discussion discloses and describes an exemplary embodiment of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. A collimator assembly comprising:
a light source for emitting light;
a light guide disposed about an axis for collimating the light; and
said light guide defining at least one collimating reflective surface having a paraboloidal shape with a collimating focal point disposed substantially on said axis of said light guide and said light guide defining a main reflective surface having a virtual focal point substantially similar to said collimating focal point.

2. A collimator assembly, comprising:
a light source for emitting light;
a light guide disposed about an axis for collimating the light; and
said light guide defining at least one collimating reflective surface having a paraboloidal shape with a collimating focal point disposed substantially on said axis of said light guide and said light guide defining a main reflective surface having a virtual focal point substantially similar to said collimating focal point and defining an output surface, and wherein said wherein at least one of said collimating reflective surface and said output surface includes spread optics.

3. The collimator assembly as set forth in claim 2 wherein said collimating reflective surface comprises a plurality of paraboloidal segments of various focal lengths with substantially common focal points.

4. The collimator assembly as set forth in claim 2 wherein said light guide has an input surface and a thickness and wherein said collimating and virtual focal points are spaced from said input surface by a distance which is approximately equal to or less than said thickness of said light guide.

5. The collimator assembly as set forth in claim 2 wherein said collimating reflective surface is a paraboloidal surface.

6. The collimator assembly as set forth in claim 2 wherein said main reflective surface includes first and second reflecting surfaces that have one of a line and a parabolic and a circular shape as viewed in cross-section.

7. The collimator assembly as set forth in claim 2 wherein said light source is a light emitting diode.

8. The collimator assembly as set forth in claim 2 further including a plurality of light guides arranged in side-by-side relationship with one another.

9. The collimator assembly as set forth in claim 8 further including a plurality of light sources each aligned with one of said light guides.

10. A collimator assembly comprising:
a plurality of light sources spaced from one another for emitting light;

a plurality of light guides with each light guide being aligned with one of said light sources;

each of said light guides defining at least one collimating reflective surface having a paraboloidal shape with a collimating focal point disposed substantially on said axis of said light guide;

each of said light guides defining a main reflective surface having a virtual focal point substantially similar to said collimating focal point; and said light sources being spaced from one another such that at least some light emitted by one light source can be guided by the light guide aligned with another light source.

11. The collimator assembly as set forth in claim 10 wherein said light sources are light emitting diodes.

12. The collimator assembly as set forth in claim 10 wherein each of said light guides defines an input surface.

13. The collimator assembly as set forth in claim 12 wherein each light guide has a thickness and wherein said collimating and virtual focal points are spaced from said input surface by a distance which is approximately equal to or less than said thickness of said light guide.

14. The collimator assembly as set forth in claim 10 wherein each of said light guides defines an output surface.

15. The collimator assembly as set forth in claim 14 wherein said output surface of each of said light guides defines a plurality of spread optics.

16. The collimator assembly as set forth in claim 10 wherein said collimating reflective surface of each of said light guides defines a plurality of spread optics.

17. The collimator assembly as set forth in claim 10 wherein said collimating reflective surface of each of said light guides comprises a plurality of paraboloidal segments of various focal lengths and with substantially common focal points.

* * * * *